(12) United States Patent
Schibilla

(10) Patent No.: US 6,263,459 B1
(45) Date of Patent: Jul. 17, 2001

(54) ON THE FLY WRITE REALLOCATION

(75) Inventor: Mark R. Schibilla, Rochester, MN (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/303,089

(22) Filed: Apr. 29, 1999

(51) Int. Cl.[7] .................................................... G06F 11/00
(52) U.S. Cl. .............................................................. 714/710
(58) Field of Search ........................ 714/710, 15; 369/53; 360/53

(56) References Cited

U.S. PATENT DOCUMENTS

| 5,235,585 | 8/1993 | Bish et al. |
| 5,271,018 | 12/1993 | Chan |
| 5,721,816 | * 2/1998 | Kusbel et al. ........................ 714/15 |

FOREIGN PATENT DOCUMENTS

WO 98/03970    1/1998    (WO) .

* cited by examiner

Primary Examiner—Phung M. Chung
(74) Attorney, Agent, or Firm—Milad G Shara

(57) ABSTRACT

A method for reassigning a defective data site on a disk surface of a disk drive during a write operation. When a write error is detected while writing a data block to a user data site, a write error recovery procedure is performed on the user data site. If the write error recovery procedure determines that the user data site contains an unrecoverable error, the data block is written to a spare data site located at a different area of the disk surface, and a cross-reference entry for the reassignment is stored in memory on the disk drive. Upon completion of the write operation, the user data sites encountering write errors are reassigned to the spare data sites. The reassignment operation includes marking all user data sites encountering write errors as defective data sites, adding all user data sites encountering write errors to a list of defective data sites, and writing the reassignment cross reference entries stored in the disk drive memory to the disk surface. The method can handle reallocation of multiple unrecoverable data sites within each disk write operation.

11 Claims, 4 Drawing Sheets

ON THE FLY WRITE REALLOCATION

BACKGROUND OF THE INVENTION

1. Field of the Invention

The present invention relates to hard disk drives. More particularly, the present invention relates to a method for reassigning a defective data site on a disk surface during a write operation.

2. Description of the Prior Art

Hard disk drives store large volumes of data on one or more disks mounted on a spindle assembly. Disk drives employ a disk control system for interfacing with a host (e.g., a computer) to control the reading and writing of data on a disk. Each disk includes at least one disk surface which is capable of storing data. On each disk surface, user data is stored in concentric circular tracks between an outside diameter and an inside diameter of the disk.

As a result of the manufacturing process, defective data sites may exist on the disk surfaces of the disk drive. These defective data sites are termed "primary defects". A defect discovery procedure is performed to locate these defects and mark them out as defective locations on the disk surface which are not available for use. A typical defect discovery procedure includes writing a known data pattern to the disk surface and subsequently reading the data pattern from the disk surface. Defective data sites are identified by comparing the data pattern read from the disk surface with the known data pattern written to the disk surface.

Following the defect discovery procedure, defective data sites are put in a primary defect list which is stored in a table. The primary defect list is used during formatting of the disk surface to generate a defect management table. Within the defect management table, the defective data sites may be mapped to data sector locations (cylinder number, head number, and data sector number). Once identified in the defect management table, the defective data sectors may not be used for storing data.

Defective data sites encountered after formatting the disk surface are known as "grown defects" or "secondary defects". Grown defects often occur in locations adjacent to defective data sites found during defect discovery. Grown defects are also listed in a table, similar to that utilized by the "primary defects". The number of sites marked out on a disk drive as "defective data sites" is used as a measure of the quality of the disk drive. Grown defects encountered during the operation of the disk drive are also added to the defect management table. The defect management table is utilized during the operation of the disk drive to identify defective data sites on the disk surface.

Defects such as "primary defects" and "grown defects" are known as hard sector errors (i.e., unrecoverable sector errors). A hard sector error is essentially permanent in nature, thus the sector cannot be recovered. A disk may also contain transient or "soft" data sector errors. A transient error is defined as an error or defect which clears over a period of time. For example, a transient error may occur due to a thermal asperity on the disk surface. A retry mode may be entered, wherein the command (such as a write) is retried a number of times allowing sufficient time to pass for the transient error to clear. Transient errors are also logged on the drive as they occur.

During operation of the disk drive, data blocks contained within marginally defective sectors (i.e., sectors where the "soft" error rates have reached unacceptable levels, but where the data block is still recoverable) may be reassigned to alternate sectors via various methods. Hicken (U.S. Pat. No. 5,822,142) describes a data sector slipping scheme (i.e., push-down scheme) to reassign data blocks from marginally defective sectors on a disk surface. Bish et al. (U.S. Pat. No. 5,235,585) provides another method for reassigning marginally defective data sectors on a disk to spare data sectors on the disk via a vectoring operation.

In contrast to the data recovery/reassignment of marginally defective data sectors described in the preceding paragraph, when unrecoverable (i.e. hard errors) are encountered during a data write operation to a defective data sector, no method currently exists for an "on-the-fly" reallocation of defective data sectors encountered during a write operation to an alternate sector. In a typical write operation, if a write is attempted to a defective data sector, the drive issues "an unrecoverable write error" message to the user of the drive, and the write operation is terminated. When the user receives such a message, the user may assume the disk drive is no longer usable. Alternatively, the disk drive may perform the write operation to the defective data sector, resulting in subsequent loss of the block of data written to the defective data sector.

SUMMARY OF THE INVENTION

The present invention provides a method for reassigning a defective data site on a disk surface during a write operation. The method begins by providing a pool of spare data sites. The method also provides a write error recovery procedure. The method writes a data block on the disk surface in a user data site, and while writing the data block, a write error is encountered. After encountering the write error, the method then performs the write error recovery procedure to rewrite the data block in the user data site and if the write error persists, writes the data block to the spare data site. Upon completion of the write operation, the method reassigns all user data sites encountering write errors to the spare data sites within the pool of spare data sites.

In one embodiment of the present invention, a vector reassignment scheme is employed to reassign all user data sites encountering write errors to the spare data sites within the pool of spare data sites. The present invention provides for two or more of the user data sites to be reassigned to the spare data sites during the write operation. In a preferred embodiment of the present invention, up to eight user data sites are reassigned to the spare data sites during the write operation.

In one embodiment of the present invention, the method step of writing the data block to a spare data site within the pool of spare data sites includes updating a cross-reference table to cross-reference the location of the user data site encountering the write error to the location of the spare data site. The cross-reference table resides within Random Access Memory (RAM) within the disk drive.

In one embodiment of the present invention, the method step of reassigning all user data sites encountering write errors to the spare data sites within the pool of spare data sites further includes the steps of: marking all user data sites encountering write errors as defective data sites; adding all user data sites encountering write errors to a list of defective data sites; and copying the cross-reference table from the RAM on the disk drive to a location on the disk surface.

In the present invention, the spare data site is chosen from one or more spare data sites located on the disk surface. In one embodiment of the present invention, the one or more spare data sites are contiguously grouped into a pool of spare data sites. A single pool of spare data sites exists on each disk. The method of the present invention is implemented in firmware residing within a disk control system of the disk drive.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Within the drawings, like numbers designate like elements.

DETAILED DESCRIPTION

Figure 1:
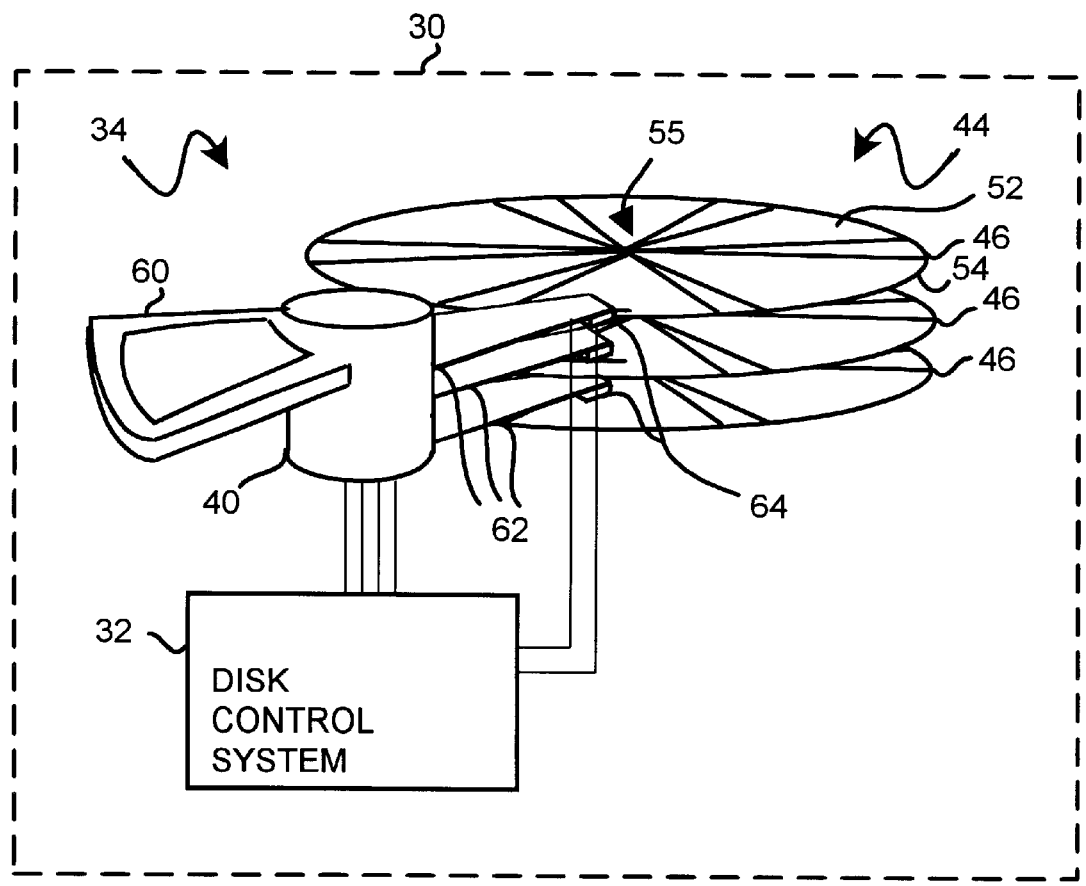
FIG. 1 is a block diagram illustrating a hard disk drive system in accordance with the present invention.

FIG. 1 is a block diagram illustrating a hard disk drive in accordance with the present invention. Disk drive 30 includes a disk control system 32 (e.g., a controller) and a head disk assembly (HDA) 34. Disk control system 32 includes circuitry and processors which provide an intelligent disk control system interface between a host system (not shown) and HDA 34 for execution of read and write commands. The host system can include a microprocessor based data processing system such as a personal computer, or other system capable of performing a sequence of logical operations. Further, disk control system 32 includes an embedded servo system for controlling the HDA 34. Disk control system 32 can be similar to other disk control systems known to those skilled in the art. Finally, disk control system 32 includes firmware for implementing the method for recovering marginally defective data sites on a disk surface of the present invention.

HDA 34 include a rotary actuator assembly 40 and a disk assembly 44. Disk assembly 44 includes one or more magnetic media disks, such as indicated at 46. Disks 46 are stacked on a spindle assembly (not shown) for rotating disks 46 at a high rate of speed. Each disk 46 preferably has two disk recording surfaces (i.e., disk surfaces) capable of storing data thereon, such as indicated at 52 and 54. Each disk surface has a plurality of repeating servo track patterns defining radially spaced-apart servo tracks, generally indicated at 55.

Rotary actuator assembly 40 includes a voice coil motor (VCM) 60 and multiple actuator arms 62 extending from VCM 60. Each actuator arm 62 corresponds to a respective disk, and may have one or two transducer heads 64 disposed at a distal end. Each transducer head 64 is associated with a corresponding disk surface 52, 54.

Figure 2:
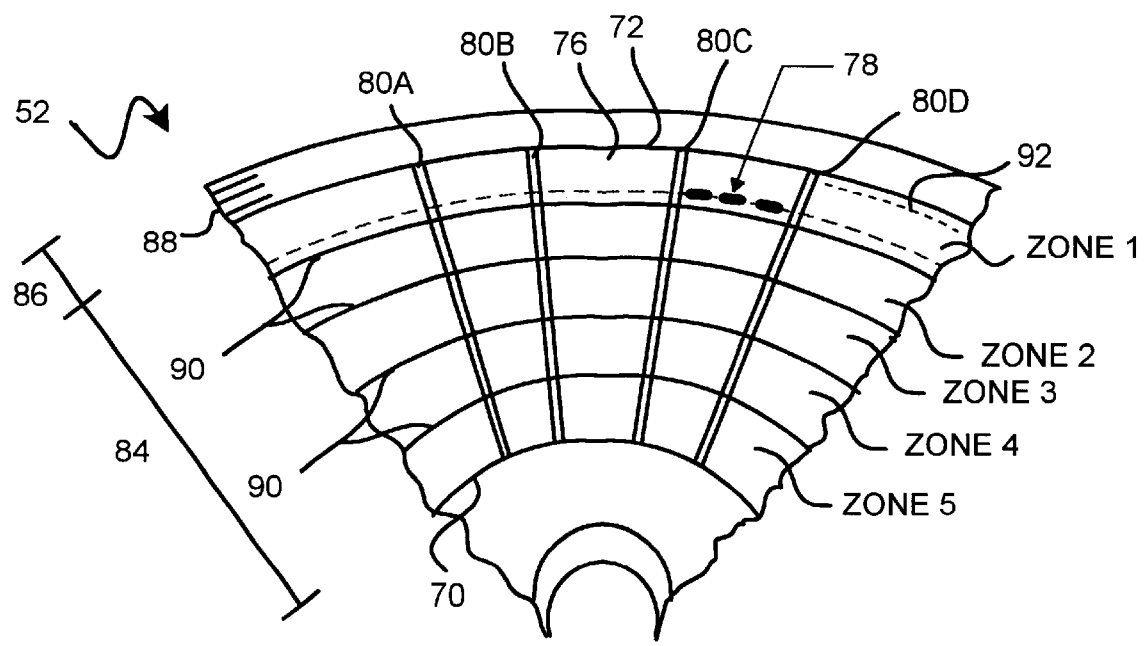
FIG. 2 is partial plan view of a disk surface having data sites and a pool of spare reassignment data sites.

FIG. 2 is partial plan view of a disk surface having data sites, including at least one marginally defective data site, and a pool of spare reassignment data sites. Disk surface 52 includes an inner boundary 70 and an outer boundary 72. Data is stored on concentric, circular tracks, indicated by representative dashed line 76, between inner boundary 70 and outer boundary 72. Recorded information (i.e., user data) on the disk surface is divided into data regions or groups of data sectors 78 (i.e., data sites). Information for a servo system tracking the position of heads 64 is recorded in embedded servo sectors or servo "wedges" placed in radially continuous narrow regions between groups of data sectors 78, indicated at 80A, 80B, 80C and 80D. Servo information is contained in the servo sectors 80A, 80B, 80C and 80D in a number of fields. Typically, there are a plurality of data sectors 78 grouped between pairs of servo "wedges".

Disk surface 52 includes a user data band 84 (or user data area) and a reserved band 86 (or reserved area). User data band 84 includes a plurality of user data tracks on the disk surface 52. The reserved band 86 is located outside the user data band 84, and typically comprises a number of "reserved" data tracks (e.g. 1 to 20 data tracks), indicated at 88. The user data band on disk surface 52 is used for storing user data during operation of the disk drive 30. The reserved band of the disk surface is utilized for storing drive specific data or "optimization" data.

Using zone recording techniques, groups of adjacent data tracks are assigned to a plurality of zones between the inner boundary 70 and the outer boundary 72. In the illustrated embodiment, disk surface 52 has been partitioned into five physical zones, illustrated by partitions 90, labeled ZONE 1, ZONE 2, ZONE 3, ZONE 4, and ZONE 5. Disk surface 52 may be partitioned into any desirable usable number of zones, which more typically ranges between 10 and 16 zones. The establishment of zones allows for efficiency in recording by varying recording frequencies to maintain approximately constant linear bit density across the disk as is well known in the art.

In one embodiment of the present invention, disk surface 52 includes a spare pool 92 of contiguous data sites located at the outer diameter of a physical zone. Data sites within the spare pool 92 are utilized by the present invention when reassigning data from a defective data site. In a preferred embodiment, spare pool 92 contains approximately 1000 contiguous data sites.

Figure 3:
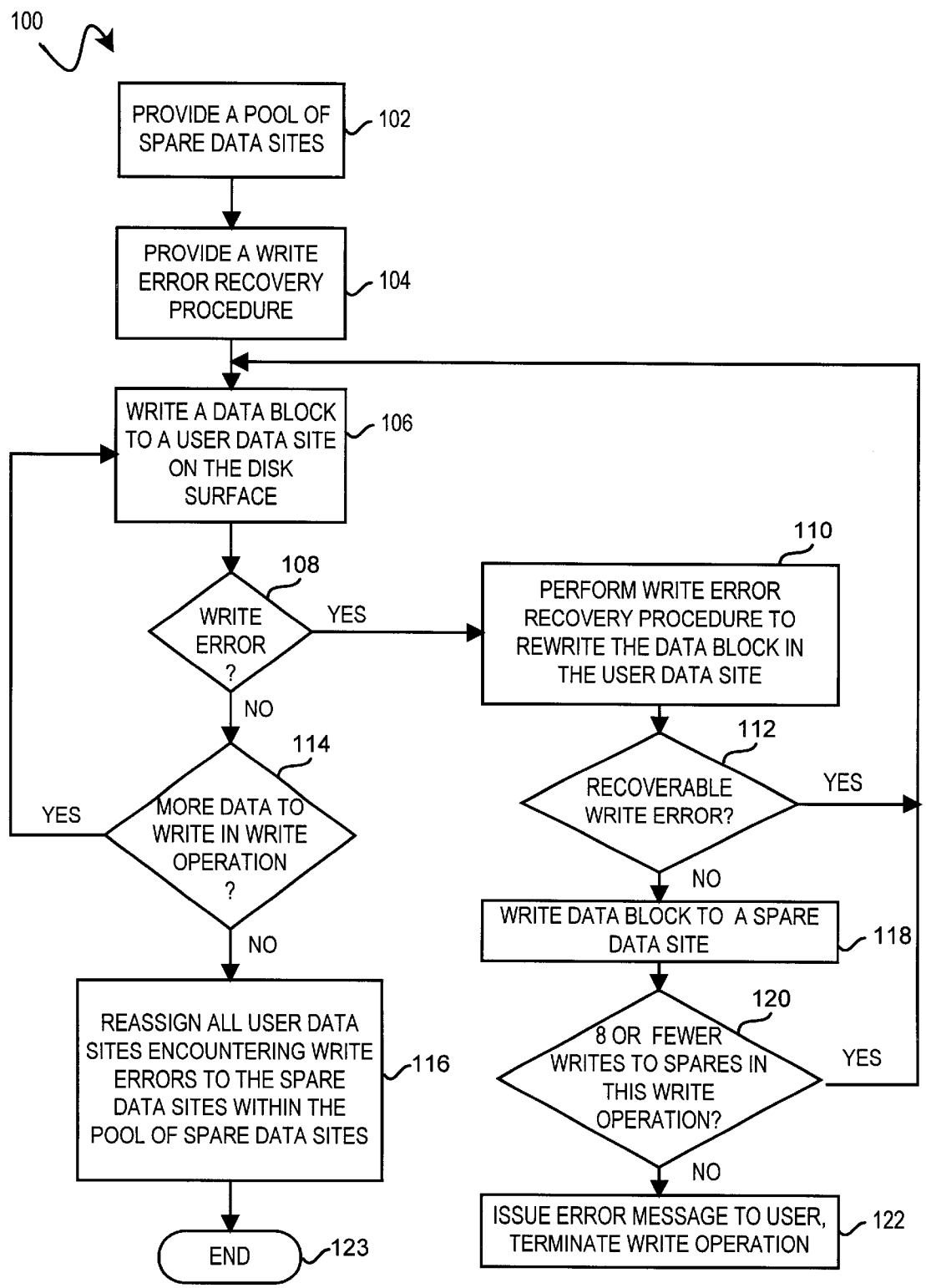
FIG. 3 illustrates a flow chart of the method for reassigning a defective data site on a disk surface during a write operation of a disk drive.

FIG. 3 illustrates a flow chart of the method for reassigning a defective data site on a disk surface during a write operation of a disk drive, shown generally at 100. The method begins by providing a pool of spare data sites, as indicated at block 102. As described above, the pool of spare data sites is used by the present invention when reassigning data from a defective user data site. At block 104, the method provides a write error recovery procedure which attempts to resolve write errors when they occur during a write operation to the user data sites on the disk surface. Write error recovery procedure 104 may utilize a variety of techniques to recover from a write error encountered during a write operation to a user data site. In one instance, write error recovery procedure 104 attempts multiple rewrites to the data block encountering errors in order to attempt to resolve the write error.

Next, a data block is written to a user data site on the disk surface, as indicated at block 106. At decision block 108, the method determines if any write errors have occurred during the writing of the data block to the user data site. If no errors are encountered during the write of the data block to the user data site, the method next determines if any additional data blocks are to be written in the current write operation, as indicated at decision block 114. If additional data blocks are to be written in the current write operation, the method returns to block 106 to write the next data block to a user data site on the disk surface. If no additional data blocks are to be written in the current write operation, the method then reassigns all user data sites encountering write errors to the spare data sites within the pool of spare data sites, as indicated at block 116.

The reassignment includes marking all user data sites encountering write errors as defective data sites, adding all user data sites encountering write errors to a list of defective data site, and copying a cross-reference table containing site reassignments from read only memory (RAM) within the disk drive controller to the surface of the disk. After any necessary reassignments are completed, the method ends, as indicated at block 123.

If an error is encountered during the write operation, as indicated at block 108, the write error recovery procedure is performed, as indicated at block 110. The write error recovery procedure utilizes a variety of techniques to recover from a write error encountered during a write operation to a user data site. In one instance, write error recovery procedure attempts multiple rewrites to the data block encountering errors in order to attempt to resolve the write error.

If the write error recovery procedure successfully resolves the write error, the method returns to block 106 to write the next data block to a user data site on the disk surface. However, if the write error is determined to be unrecoverable after performing the write error recovery procedure, the data block is written to a spare data site within the pool of spare data sites, as indicated at block 118. At block 120, the method determines whether there have been eight or fewer writes to spare data sites in the current write operation. If there have been eight or fewer writes to spare data sites in the current write operation, the method returns to block 106 in order to write the next data block to a user data site on the disk surface. If more than eight writes have occurred to spare data sites in the current write operation, the method issues an error message to the user, and terminates the write operation, as indicated at block 122.

Figure 4:
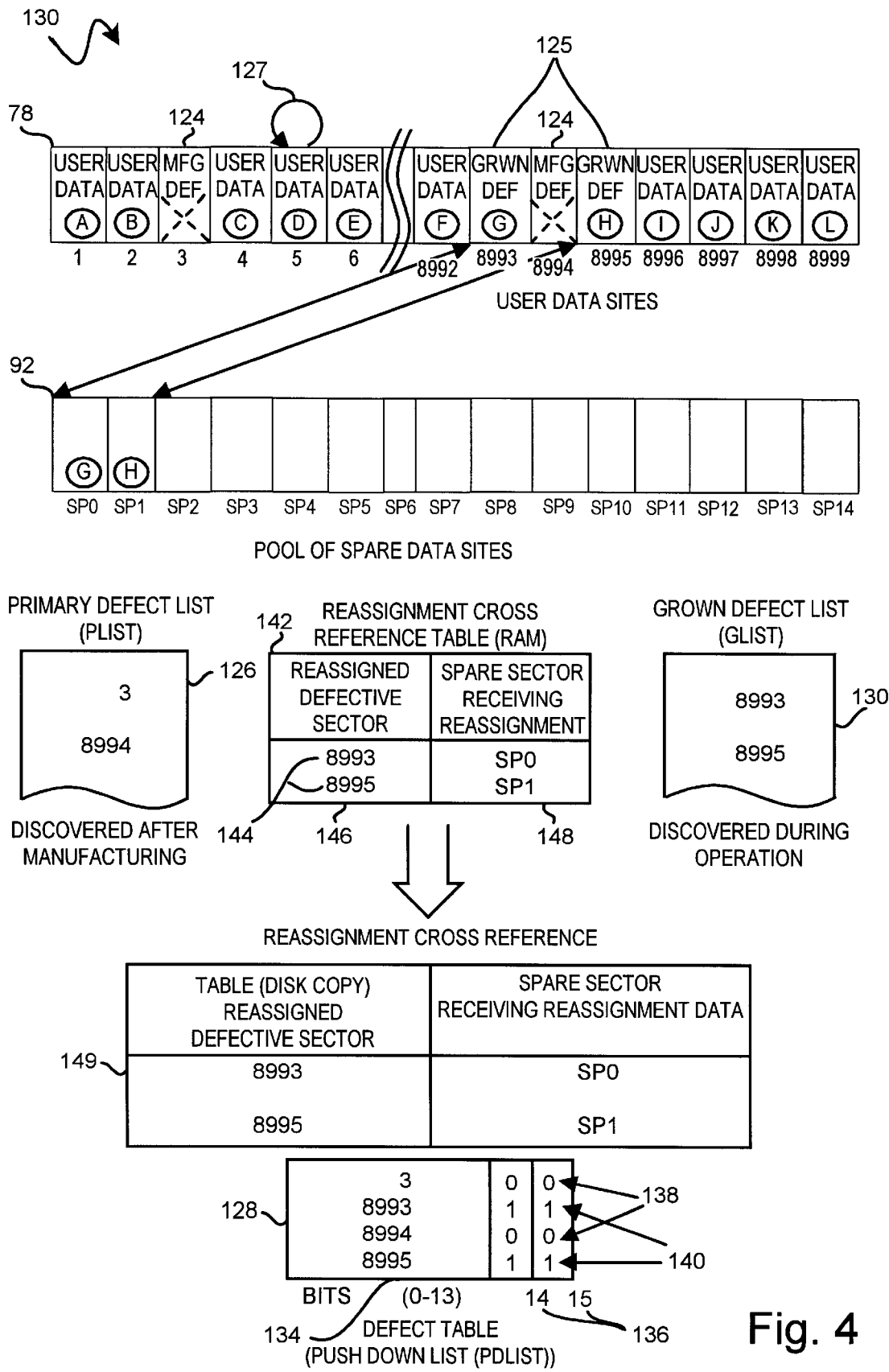
FIG. 4 illustrates an embodiment of the present invention, wherein a method for reassigning defective data sites on a disk surface during a write operation is employed.

FIG. 4 illustrates an embodiment of the present invention, wherein a method for reassigning defective data sites on a disk surface during a write operation is employed. As described above, the disk drive surface includes a plurality of data sites 78 which are used to store user data. After manufacturing, the disk drive surface is analyzed in order to identify data sites 78 which may be defective. In the illustrated embodiment, user data sites 78 located at physical sector addresses "3" and "8994" contain manufacturing defects (also known as primary defects), as shown at 124. These defective data sites 124 must be identified and recorded so that the data sites may be avoided during normal operation of the disk drive. As a result, the location addresses of these defective data sites are recorded in a primary defect list (PLIST) 126 and also in an operational defect table 128.

Primary defect list 126 is used to archive the location addresses of defective data sites discovered after manufacturing such that users can retrieve the information at a later time. As an example, the number of data sites residing on primary defect list 126 provides to the user a generalized indication of the disk media quality. Operational defect table 128 is referenced during the operation of the disk drive by firmware within the disk control system to identify sites to avoid while performing data read and write operations. Entries in the primary defect list are stored in a cylinder/head/wedge/position/length format. This allows a single primary defect list defect entry to represent defects of varying lengths (e.g., multi-sector defects).

Each primary defect entry recorded within operational defect table 128 contains two fields: a location field 134 and an entry type field 136. The primary defect entry has a sixteen bit format, where the address of the defect is recorded in the first fourteen bits (0–13) of the entry, and the entry type field includes a two bit defect identifier recorded in bits "14" and "15", as shown at 136. Primary defect entries recorded within operational defect table 128 are typically skip type entries, wherein each skip type entry represents a single sector location on the disk surface. Thus, when operational defect table 128 is generated at format time, multiple operational defect table entries may be generated for a given primary defect list entry, where the primary defect list entry represents a multi-sector defect. Each primary defect is indicated within operational defect table 128 as a skip type entry by recording the appropriate setting in the entry type field 136. The settings within the entry field of the primary defect entry recorded within operational defect table 128 indicates that the address is to be skipped during the operation of the disk drive.

When the disk drive initiates a write operation which spans a data site containing a primary defect (i.e., manufacturing defect) 124 during normal operation, the drive firmware scans operational defect table 128, and finds a matching entry for the address of the data sites containing the primary defect. Columns 14–15 of the matching entry indicate that the data site is to be skipped (i.e., the entry is a skip type entry), so the disk drive controller is set up to skip over the defective site. This can be accomplished by data pointer register settings which allow for automatic skip or by terminating an operation at the defect site and restarting at the next contiguous valid site.

During operation of the disk drive, defects can develop in user data sites 78. Defects which develop during operation of the drive are known as grown defects. During a write operation, write errors may be encountered while writing data blocks to user data sites 78. In some instances, these write errors may be recovered by performing a write error recovery procedure, as illustrated at block 110 of FIG. 3. As illustrated in FIG. 3, write error recovery procedure 110 utilizes a variety of techniques to recover from a write error encountered during a write operation to a user data site. In one instance, write error recovery procedure attempts multiple rewrites to the data block encountering errors in order to attempt to resolve the write error. In some instances, the data site contains a recoverable error which the write error recovery procedure is able to correct, as illustrated at 127. After the recoverable error is corrected, the recovered data site contains the data block, and the write operation continues its normal operation. However, in some instances, the write error recovery procedure fails, and the data site becomes unrecoverable (i.e., contains a grown defect), as indicated at user data site locations "8993" and "8995."

When a unrecoverable data site is encountered during a write operation, the data block is written to a spare data site within a pool of spare data sites 92 at an alternate location on the disk surface. In the illustrated embodiment, data blocks from grown defect data sites "8993" and "8995" discovered during a write operation are written to spare data sites "SP0" and "SP1", respectively. After the data block has been written to the spare data site, a vector cross-reference entry 144 is written to a reassignment cross-reference table residing in random access memory (RAM) of the disk controller. Each vector cross-reference entry 144 includes a reference to the data site containing the unrecoverable grown defect (shown at 146) along with a corresponding reference entry to the spare data site receiving the reassignment (shown at 148).

While data blocks from unrecoverable data sites discovered during the write operation are written "on-the-fly" to spare data sites during the write operation, the actual reassignment of the unrecoverable data sites to spare data sites does not occur until after the write operation has been successfully completed. This prevents partial reassignments from occurring when an operational failure (e.g., a power cycle) terminates an in-progress write operation.

Upon completion of the write operation, the present invention marks all user data sites encountering write errors as defective data sites, adds all user data sites encountering write errors to a list of defective data sites, and copies the reassignment cross-reference table from random access memory (RAM) to a location on the disk surface.

Data sites encountering write errors during the write operation are marked as defective by adding the location of the defective data sites to the operational defect table 128 as vector type (i.e. data pointer) entries. As a result of the defect discovery procedures described above, operational defect table 128 contains both skip type entries, as indicated at 138, and vector type entries, as indicated at 140. Skip type entries are distinguished from vector type entries by the bit settings in columns 14 and 15 of the operational defect table entry. In the illustrated embodiment, bit setting "00" in columns 14 and 15 indicate a skip type entry 138 (i.e. PLIST defect), while bit setting "11" in columns 14 and 15 indicates a vector type entry 140. Bit settings "01" and "10" (not illustrated) in the operational defect table 128 are used to represent two different types of track defects.

The data sites encountering write errors during the write operation are also added to grown defect list (GLIST) 130. As described earlier, GLIST contains a list of user data site locations containing unrecoverable errors discovered during operation. Finally, the reassignment cross-reference table is copied from random access memory (RAM) to a location on the disk surface. By copying the reassignment cross-reference table from RAM to the disk surface, the data site reassignments are made "permanent" in the event of an interruption to the normal operation of the disk drive (e.g., a power cycle).

We claim:

1. In a disk drive, a method for reassigning a defective data site on a disk surface during a write operation for writing a series of data blocks on the disk surface, the method comprising the steps of:

providing a pool of spare data sites;

providing a write error recovery procedure;

executing the write operation to write the series of data blocks on the disk surface, and while the write operation is being executed:

encountering a write error when writing one of the series of data blocks on the disk surface in a user data site;

performing the write error recovery procedure to rewrite the one data block in the user data site and if the write error persists, writing the one data block to a spare data site within the pool of spare data sites;

completing the write operation; then reassigning the user data site where the write error was encountered to the spare data site within the pool of spare data sites.

2. The method of claim 1, wherein a vector reassignment scheme is employed to reassign all user data sites encountering write errors to the spare data sites within the pool of spare data sites.

3. The method of claim 1, wherein data blocks from two or more of the user data sites are reassigned to the spare data sites during the write operation.

4. The method of claim 3, wherein up to eight of the user data sites are reassigned to the spare data sites during the write operation.

5. The method of claim 1, wherein writing the data block to a spare data site within the pool of spare data sites further comprises updating a cross-reference table to cross-reference the location of the user data site encountering the write error to the location of the spare data site.

6. The method of claim 5, wherein the cross-reference table resides within Random Access Memory (RAM) within the disk drive.

7. The method of claim 6, wherein reassigning all user data sites encountering write errors to the spare data sites within the pool of spare data sites further comprises the steps of:

marking all user data sites encountering write errors as defective data sites;

adding all user data sites encountering write errors to a list of defective data sites; and copying the cross-reference table from the RAM on the disk drive to a location on the disk surface.

8. The method of claim 1, wherein the spare data site is chosen from one or more spare data sites located on the disk surface.

9. The method of claim 8, wherein the one or more spare data sites are contiguously grouped into a pool of spare data sites.

10. The method of claim 9, wherein a single pool of spare data sites exists on each disk.

11. The method of claim 1, wherein the method is implemented in firmware residing within a disk control system of the disk drive.

* * * * *